(12) United States Patent
Farrugia et al.

(10) Patent No.: US 9,574,036 B2
(45) Date of Patent: *Feb. 21, 2017

(54) METALLO IONOMER POLYMERS

(71) Applicant: Xerox Corporation, Norwalk, CT (US)

(72) Inventors: Valerie M Farrugia, Oakville (CA); Wendy Chi, North York (CA); Sandra J Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,027

(22) Filed: May 7, 2015

(65) Prior Publication Data

US 2016/0326284 A1     Nov. 10, 2016

(51) Int. Cl.
    *C08F 220/56*      (2006.01)
    *C08F 212/08*      (2006.01)

(52) U.S. Cl.
    CPC .................... *C08F 212/08* (2013.01)

(58) Field of Classification Search
    CPC ..................................... C08F 212/08

USPC ............................................ 524/547
See application file for complete search history.

(56) References Cited

U.S. PATENT DOCUMENTS

| | | | |
|---|---|---|---|
| 2012/0202148 A1* | 8/2012 | Veregin | G03G 9/093 430/108.1 |
| 2013/0071143 A1 | 3/2013 | Blanton et al. | |
| 2014/0194547 A1* | 7/2014 | Minagawa | C08F 2/50 522/115 |

OTHER PUBLICATIONS

Acevedo-Parra et al., "Synthesis . . . Applications," J Macro Sci, Part A, Pure Appl Chem 49, 876-884, 2012.
Norones-Ramirez et al., "Silver . . . Bacteria," Sci Trans Med Jun. 19, 2013; 5(190): 190ra81.doi:10.1126/scutranslmed.300276.

* cited by examiner

*Primary Examiner* — Hui Chin
(74) *Attorney, Agent, or Firm* — Marylou J. Lavoie, Esq. LLC

(57) ABSTRACT

Ionomer composite resins and core/shell nanoparticles are described. The ionomer resin contains a metal ion. The metal can be in the core, shell or both.

19 Claims, No Drawings

METALLO IONOMER POLYMERS

FIELD

The disclosure relates to polymerization methods comprising styrene/acrylate polymer resins with metal ion used, for example, in core-shell organic/inorganic nanoparticles, for example, with a shell comprising the ionomer, which can be used to make toner.

BACKGROUND

There is a growing interest in embedding nano-metals in polymer matrices because of antimicrobial and conductivity properties (thermal and electrical). By combining the properties from both inorganic (i.e., silver, gold, copper etc.) and organic (polymer) systems, new composite products can be generated that find expanded use in antimicrobial applications, thermal and electrical conductivity applications, and so on.

Metals have been used in medical care to prevent and to treat infection. In recent years, that technology has been applied to consumer products to prevent transmission of infectious disease and to kill harmful bacteria, such as, Staphylococcus and Salmonella. In common practice, noble metals, metal ions, metal salts or compounds containing metal ions having antimicrobial properties can be applied to surfaces to impart an antimicrobial property to the surface. If, or when, the surface is inoculated with harmful microbes, the antimicrobial metal ions or metal comp exes, in effective concentration, slow or prevent growth of those microbes.

In the context of antimicrobial coatings, colloidal silver has been indicated to work as a catalyst disabling a metabolic enzyme that bacteria, fungi and viruses have. Many pathogens can be eradicated effectively in the presence of even minute traces of silver. Indeed, colloidal silver is effective against more than 650 different pathogens. Unlike antibiotics, strains resistant to silver have yet to be identified.

Another area of interest is the use of composite resins in products that utilize the thermal and/or electrical conductivity properties of the metals. Those include, inks, toners, biosensor materials, composite fibers, cryogenic, superconducting materials, cosmetic products, and electronic components. Methods, such as, 3D printing and ink jet deposition, can be used to manipulate the functional composite resins to form a substrate or device of choice.

Conventional methods for making polymer/metal nanostructured materials require melt mixing or extrusion of metal nanoparticles with polymer matrixes which often leads to aggregated metal particles, as reported in the literature (also called ex situ).

New methods are emerging slowly that use in situ synthesis of metal nanoparticles in polymer matrices which involves the dissolution and reduction of metal salts on matrices or simultaneous incorporation during polymer synthesis. The polymer matrix has a role in keeping the metal nanoparticles dispersed as well as maintaining overall chemical and mechanical stability. WO 2013026961 describes a process for obtaining an ionomer, such as, an antimicrobial amorphous ionomer composition wherein at least one amine functional polymer is reacted with a silver halide. The metal is incorporated into the polymer after formation of the polymer, not during polymer formation.

There remains a need for new methods and composite binder resins wherein metal ion is incorporated within the polymer backbone during synthesis. Ionomer composite resins and core/shell nanoparticles thereof, wherein metal ion (meth)acrylate monomers are polymerized with styrene/ monomers to form the resins, are described.

SUMMARY

The instant disclosure describes metal ion composite ionomer resins, use thereof in composite core-shell nanoparticles, methods for preparing the ionomer resins and composite nanoparticles and articles comprising the composite binder resins thereof. In embodiments, the ionomer styrene/acrylate resin comprises at least one metal ion. In embodiments, the composite nanoparticle comprises a core comprising at least one styrene/acrylate polymer core resin, optionally comprising a metal; and, a shell comprising a metal ion, in embodiments, a styrene/acrylate-metal ion ionomer resin or nanoparticle. In embodiments, metal ions and/or nanoparticles are included by a reduction reaction.

In embodiments are provided methods for preparing the composite nanoparticles wherein the core resin can be polymerized from an emulsion comprising at least one styrene monomer, at least one acrylate monomer, optionally a chain transfer agent, optionally a branching agent, optionally a metal ion and optionally an initiator and a shell comprising a metal ion, for example, a resin is polymerized on the surface of a core particle where the shell resin comprises an acrylate/styrene emulsion comprising at least one metal ion, an optional chain transfer agent, an optional branching agent and an optional initiator. In embodiments, a metal is reduced on the surface of a core particle or a core-shell particle.

In embodiments are provided articles comprising the composite ionomer nanoparticles. The articles include a biochemical sensor, an optical detector, an antimicrobial, a textile, a fuel cell, a functional smart coating, a solar cell, a cosmetic, an electronic component, a fiber or a cryogenic superconducting material. In embodiments, the composite nanoparticle is a binder resin and the article is an aqueous ink, a dry ink, a toner particle, an antimicrobial coating, an additive, a finish, a paint, or a composite for 3-dimensional printing. The composite nanoparticles, and the articles comprising those nanoparticles, exhibit antimicrobial properties, thermal and electrical conductivity properties and/or good thermal stability.

DETAILED DESCRIPTION

A) Introduction

The present disclosure provides a styrene/acrylate binder resin comprising at least one metal ion. In embodiments, the binder resin is an acrylate/styrene ionomer comprising, and synthesized by polymerization of, at least one metal ion acrylate or methacrylate monomer. In embodiments, the binder resin is a composite nanoparticle comprising a core of styrene/acrylate polymer resin and a shell comprising the composite styrene/acrylate ionomer resin. In embodiments, a metal is reduced with the core, with the shell or both. Those binder resins are antimicrobial, comprise thermal and electrical conductivity or thermal stability, and find use in preparation and/or manufacture of a range of articles, such as, inks (aqueous and dry), toner, sensors (bio and chemical), antimicrobial coatings, paint, electrical components, composites for 3-dimensional printing, additives, finishes, solar cells, fuel cells etc.

A shell, such as, a resin comprising a metal or a reduced metal, for example, may cover the entire surface of a core particle or portions thereof. Hence, a shell can encompass the entire exterior surface of a particle, thereby encapsulating a core particle or be found, for example, at sites on the surface of a core, as isolated patches of varying size, islands and so on.

In embodiments, the metal ion composite monomer is silver acrylate or silver methacrylate, Silver is known for antimicrobial properties, however, for silver to have any antimicrobial properties, generally, the silver must be ionized (Lok et al., J Biol Inorg Chem, 12:527-534, 2007: Rai et al., Biotech Adv, 27:76-83, 2009); non-ionized silver often is inert (Guggenbichler et al., Lace 27, Suppl 1:S16-23, 1999). It is thought silver atoms bind to thiol groups (—SH) in enzymes causing deactivation of the enzymes. Silver forms stable S—Ag bonds with thiol-containing compounds in the cell membrane that are involved in transmembrane energy generation and ion transport (Klueh et al., J Biomed Mater Res 53:621-631, 2000). It also is believed that silver can take pan in catalytic oxidation reactions resulting in formation of disulfide bonds (R—S—S—R). Silver catalyzes reaction between oxygen molecules in the cell and hydrogen atoms of thiol groups: water is released as a product and two thiol groups become covalently bonded to one another through a disulfide bond (Davies & Etris, Catal Today 26:107-114, 1997). In addition, silver ions may interact with a cell destabilizing plasma membrane potential and reducing levels of intracellular adenosine triphosphate (ATP), resulting in cell death (Mukherjee et al., Theran 2014; 4(3):316-335).

Silver also is known for electrical and thermal conductivity properties. The electrical and thermal conductivity of silver is the highest of all metals.

In embodiments, silver acrylate and silver methacrylate monomers are formed by neutralization of acrylic acid or methyl acrylic acid with a source (If silver ions, such as, a silver salt. in that instance, an aqueous solution of an acrylic acid or a methyl acrylic acid is prepared and an aqueous solution of a silver salt, such as silver nitrate, is added. Once the composite monomers are formed, the composites may be purified, such as, by precipitation, and dried or prepared in an emulsion for further use. Other methods for obtaining silver acrylate monomers may be available and as well, those reagents are available commercially, silver methacrylate (CAS No. 16631-02-0) and silver acrylate (CAS No. 5651-26-3), for example, from Gelest, Inc., PA.

In embodiments, a silver acrylate monomer is incorporated in a styrene/acrylate polymer via polymerization, that is, as a monomer that is covalently bound to another monomer to form the polymer backbone. In embodiments, the present composite ionomer is prepared by emulsion polymerization in a reactor, wherein an emulsion of at least one silver acrylate monomer, a styrene/acrylate comonomer, an optional branching agent and an optional chain transfer agent is added to a heated aqueous solution of surfactant. After reaching equilibrium, a solution of initiator can be added to the heated reactor and polymerization proceeds until completed. Formation of the latex comprising the composite ionomers may be done in isolation, wherein the ionomers optionally may be washed/screened/dried for future use, or a latex may be prepared as a multistep synthesis/polymerization of a further resin-based material, such as, a composite nanoparticle, or for production of articles, such as, inks or toners.

Incorporation of silver monomers in an ionomer, such as, with emulsion polymerization, improves stabilization of the latex composite and also allows a controlled release of silver ions from the composite. In addition, the polymer backbone prevents the silver ions from aggregating since the silver ions essentially are bonded to and integrated into a polymer backbone that enforces strict positioning of the silver ions along the polymer backbone for sensor or antimicrobial applications. The ionic polymer matrix provides a large active surface area of silver ions which can be spread strategically along the polymer backbone. For instance, the silver ions can be situated on the exterior shell of a core-shell nanoparticle for better exposure of metal ions to the environment.

In embodiments are provided composite core/shell nanoparticles wherein the core can comprise a styrene/acrylate resin, optionally comprising a metal, and a shell comprises at least one composite styrene/acrylate-metal ion polymer resin, such as, the above described silver ionomers. A core may be prepared by polymerization, such as, emulsion polymerization, of acrylate and styrene monomers. A shell resin may be prepared, as described above, and then added to an emulsion of core particles to form a shell encapsulating the core resin particles. in embodiments, a shell resin is synthesized on core particles, wherein the appropriate shell monomers and an initiator are added to the core particles. In embodiments, a meal ion is reduced on a resin or on a core particle to form a shell thereover. In embodiments, metal can be reducing during formation of a core. In embodiments, a metal can be reduced on a core. In embodiments, metal can be reduced on a shell.

In embodiments are provided methods for preparing composite nanoparticles. Methods comprise forming core particles in an emulsion polymerization latex followed by polymerization of a shell resin on the surface of core particles, wherein a core can comprise a styrene/acrylate resin and a shell can comprise at least one composite styrene/acrylate —metal ion polymer resin. In embodiments, an emulsion of core monomers (styrene monomers, acrylate monomers, optional chain transfer agent, and optional branching agents) is added to a heated solution of aqueous surfactant followed by addition of an initiator. Core reactants are polymerized to form core styrene/acrylate particles, optionally comprising a metal. Shell resin may be polymerized on core particles by addition of shell monomers followed by addition of an initiator. Following addition of a shell layer partially covering; or encapsulating core particles, composite nanoparticles optionally may be washed/screened/dried for future use, or a latex may be prepared as a multistep synthesis/polymerization of a further resin-based material, such as, for production of articles, such as, inks or toners. In embodiments, both core and shell comprise metal ion resins.

In embodiments are provided articles comprising either or both: 1) composite ionomer comprising at least one metal ion acrylate monomer and/or 2) composite core/shell nanoparticles wherein cores comprise a styrene/acrylate resin, which can comprise a metal, and a shell comprises at least one composite styrene/acrylate metal ion ionomer. An article may be selected from a biochemical sensor, an optical detector, an antimicrobial, a textile, a fuel cell, a functional smart coating, a solar cell, a cosmetic, an electronic component, a fiber, a cryogenic superconducting material and so on. In embodiments, composite nanoparticle and/or composite styrene/acrylate ionomer resin is used as a resin in inks (aqueous and dry), toner, antimicrobial coatings, additives, finishes, paint, composites for 3-dimensional printing and so on.

B) Definitions

As used herein, the modifier, "about," used in connection with a quantity is inclusive of the stated value and has the meaning dictated b the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range, "from about 2 to about 4," also discloses the range, "from 2 to 4."

As used here, "metal acrylate(s)," such as, "silver acrylate (s)." is collective for acrylate monomers comprising at least one metal atom, such as, a silver atom, for use in polymers, such as, silver acrylate and silver methacrylate which are monomers for a polymer comprising, silver.

The term "antibacterial," as used herein refers to the property of a composition for inhibiting or destroying the growth of bacteria. In other words, a toner particle comprising antibacterial properties is effective in killing bacteria, or in inhibiting growth or propagation of bacteria, including as a primed or fused image.

The term, "antimicrobial," as used herein refers to an agent, or the property imparted by the agent, that kills or inhibits growth of microorganisms or microbes. An antibacterial agent, or property thereof, is an antimicrobial agent. Microorganisms include, for example, bacteria, fungi, algae, other single celled organisms, protists, nematodes, parasites, other multicellular organisms, other pathogens and so on. In other words, a toner particle comprising antimicrobial properties is effective in killing microbes, or in inhibiting growth and propagation of microbes, including as a printed and fused image.

The term, "nano," as used in, "silver nanoparticles," indicates a panicle size of less than about 1000 nm. In embodiments, the silver nanoparticles have a particle size of from about 0.5 nm to about 1000 nm, from about 1 nm to about 500 nm, from about 1 nm to about 100 nm, from about 1 nm to about 20 nm. The particle size is defined herein as the average diameter of the silver nanoparticles, as determined by TEM (transmission electron microscopy.)

A polymer can be identified or named herein by the two or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. Also, a polymer can be composed of a styrene monomer and an acrylate monomer, and in that ease, once polymerized, can be identified based on the monomers used. Hence, if the acrylate is butyl acrylate, the resulting polymer can be called a styrene polymer, a butyl acrylate polymer, a styrene/acrylate polymer and so on.

By, "two dimension," or grammatic forms thereof, such as, 2-D, is meant to relate to a structure or surface that is substantially without measureable or discernible depth, without use of a mechanical measuring device. Generally, the surface is identified as flat, and emphasizes height and width, and lacks the illusion of depth or thickness. Thus, for example, toner is applied to a surface to form an image or coating and generally, that layer of fused toner is from about 1 µm to about 10 µm in thickness. Nevertheless, that application of toner to a flat surface is considered herein as a two dimensional application. The surface can be a sheet or a paper, for example. This definition is not meant to be a mathematic or scientific definition at the molecular level but one which to the eye of the viewer or observer, there is no illusion of thickness. A thicker layer of toner, such as one which might be identified as providing, "raised lettering," on a surface is for the purposes herein, included in the definition of 2-D.

By, "three dimension," or grammatic forms thereof, such, as, 3-D, is meant to relate to a structure composed of plural layers or particle depositions of toner that aggregate or assemble to yield a form, a shape, a construct, an object and the like that, for example, need not be applied to a surface or structure, can he autonomous and/or has a thickness or depth. Printing as used herein includes producing 3-D structures. Printing on a surface or structure also is used herein to include forming a 3-D structure by deposition of plural layers of toner. Often, the first layer is printed on a support, surface, substrate or structure. Successive layers of toner are placed thereon and the already deposited (and optionally adhered or solidified) toner layer or layers is considered herein a surface or a substrate.

C) Composite Latex i) Polymerization Composite Resin Latex

In embodiments provided herein are methods for the polymerization of styrene and acrylate monomers to form a latex comprising a composite styrene/acrylate—metal ion ionomer resin. Ionomers are polymers comprising predominantly neutral monomers with a portion that comprises acidic groups which can be complexed with a metal ion, that is such a monomer is charged.

In embodiments, the composite ionomer resin is an amorphous polymer. In embodiments, the ionomer is hydrophobic with a small degree of bonded ionic groups. Those ionic interactions produce changes in the physical, mechanical and rheological properties of the ionomer and articles comprising the composite ionomers, such as, inks and toner.

Any metal ion acrylate monomer or methacrylate monomer useful for polymerization of a styrene/acrylate latex resin may be utilized. In embodiments, acrylic or methacrylic monomers may include, but are not limited to, acrylate, methacrylate and so on, wherein the metal ion acrylate monomers are reacted with a styrene/acrylate monomer, optionally a branching agent, optionally a chain transfer agent and optionally an initiator for synthesis of the present composite ionomer resin.

Silver metal ions are known to possess antimicrobial properties and may be referred to as an antimicrobial metal ion. Suitable antimicrobial metals and metal ions include, but are not limited to, silver, copper, zinc, gold, mercury, tin, lead, iron, cobalt, nickel, manganese, arsenic, antimony, bismuth, barium, cadmium, chromium and thallium. Metal ions of for example, silver, copper, zinc and gold or combinations thereof are considered safe fir human use. Hence, silver ions, alone or in combination with copper or zinc or both, have a high ratio of efficacy to toxicity, i.e., high efficacy to low toxicity.

in embodiments are provided methods for preparing silver acrylate monomers by stoichiometric neutralization of an acrylic acid or methyl acrylic acid with a source of silver ions, such as, a silver salt. For example, an aqueous solution of an acrylic acid is cooled to below room temperature, e.g., about 0° C., and then an aqueous solution of a silver salt is added dropwise forming silver composite monomer. Silver composite monomer may be purified by precipitation and suspended in water and/or a solvent. Silver composite monomer may be dried.

In embodiments, a source of silver ion is selected from silver nitrate, silver sulfonate, silver fluoride, silver tetralluoroborate, silver oxide, silver acetate or other silver salt. In embodiments, nitrate is used as silver ion precursor for synthesis of silver methacrylate or silver acrylatemonomers. As used herein, (organic) silver salt can mean salt of monobasic and polybasic carboxylic acids and complexing agents.

Other sources of silver ion are silver salts selected from silver acetylacetonate, silver bromate, silver bromide, silver carbonate, silver chloride, silver citrate, silver iodate, silver iodide, silver lactate, silver nitrite, silver perchlorate, silver phosphate, silver sulfate, silver sulfide and silver trifluoroacetate. Silver salt particles desirably are tine for homogeneous dispersion in a solution, which aids in reaction kinetics.

In embodiments, silver composite monomer is present in an ionomer from about 0.01% to about 10%, from about 0.5% to 5% by weight of an ionomer. In embodiments, total silver present in an ionomer is from about 2,000 to about 20,000 ppm, from about 4,000 to about 15.000 ppm, from about 6,000 to about 13,000 ppm, as measured by inductively coupled plasma mass spectrometry (ICP-MS). in embodiments, total silver present in an ionomer is from about 0.02% to about 2%, from about 0.04% to about 1.5%, from about 0.06% to about 1.3% by weight of an ionomer, as measured by ICP-MS.

Any monomer suitable for preparing a styrene/acrylate latex may be utilized as a comonomer. Suitable monomers include, but are not limited to, styrenes, acrylates, methacrylates, butadienes, isoprenes, acrylic acids, methacrylic acids, acrylonitriles, combinations thereof and the like. Exemplary comonomers include, but are not limited to, styrene, alkyl acrylate, such as, methyl acrylate, ethyl acrylate, butyl acrylate, isobutyl acrylate, dodecyl acrylate, n-octyl acrylate, 2-chloroethyl acrylate; β-carboxy ethyl acrylate (β-CEA), phenyl acrylate, methyl α-chloroacrylate, methyl methacrylate (MMA), ethyl methacrylate, butyl methacrylate; butadiene; isoprene; diacrylate; methacryionitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride: N-vinyl indole; pyrrolidone; methacrylate (MA); acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof.

In embodiments, comonomers for making a composite styrene/acrylate ionomer resin particles include, but are not limited to, cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, hexyl acrylate, ethylhexyl acrylate, butyl methactylacrylate, hexyl methacrylate, ethylhexyl methacrylate, acrylic acid, methacrylic acid, dimethylamino ethyl methacrylate, 2-(dimethylamino) ethyl methacrylate, diethylamino ethyl methacrylate, dimethylamino butyl methacrylate, methylamino ethyl methacrylate and combinations thereof.

Comonomers may be polymerized, with or without a silver composite monomer, into the following exemplary styrene/acrylate polymers, such as, styrene acrylates, styrene butadienes, styrene methacrylates, and more specifically, poly styrene-alkyl acrylate), poly(styrene-1,3-diene), poly (styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene) poly(ethyl methacrylate-butadiene). poly(propyl methacrylate-butadiene), poly(butyl methacrylate-butadiene), poly(methylacrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly (styrene-butyl acrylate-acrylonitrille-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid) and combinations thereof. A polymer may be a block., random or alternating, copolymer.

When plural comonomers are used to make a composite ionomer resin, for example, styrene and alkyl acrylate, a mixture can comprise, for example, styrene, n-butyl acrylate and ADOD (diacrylate). Based on total weight of monomers, styrene may be present in an amount from about 1% to about 99%, from about 50% to about 95%, from about 70% to about 90%, although may be present in greater or lesser amounts; and acrylate(s) may be present in an amount from about 1% to about 99%, from about 5% to about 50%, from about 1.0c,% to about 30%, although may be present in greater or lesser amounts. Based on total weight of monomers, a metal ion acrylate monomer may be present in an amount from about 0.01% to about 10%, from about 0.5% to about 5%, from about 0.75% to about 2.5%, although may be present in greater or lesser amounts. In embodiments, based on total weight of monomers, a metal acrylate monomer may be present in an amount from about 0.5% to about 2% in a polymerized composite styrene/acrylate ionomer.

In embodiments, a metal acrylate, such as, a silver acrylate or methacrylate monomer optionally may be copolymerized with a charge control agent, such as, methacrylic acid, β-CEA or methylaminoethyl methacrylate, which monomers can be used to control, for example, the $T_g$ and hydrophobicity of the polymer.

In a polymerization process, reactants are added to a suitable reactor, such as, a mixing vessel. An appropriate amount of starting materials, optionally dissolved in a solvent, is combined with an optional initiator and optional one surfactant to form an emulsion. A polymer may be formed in the emulsion, which then may be recovered and used as a polymer.

In embodiments, a latex for forming composite styrenel-acrylate ionomer resin particles may be prepared in an aqueous phase containing a surfactant or co-surfactant, optionally under an inert gas, such as, nitrogen. Surfactants which may be utilized with a resin to form a latex dispersion can be ionic or nonionic surfactants in an amount of from about 0.01 to about 15 wt % of the solids, from about 0.1 to about 10 wt % of solids, Examples of suitable anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power, available from Tayca Corp., DOWFAX®, available from Dow Chemical Co., CALFAX® DB-45, a $C_{12}$ (branched) sodium diphenyl oxide disulfonate, available from Pilot Chemical Company and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12},C_{15},C_{17}$-trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

In embodiments, an initiator may be added for forming a latex. In embodiments, initiator is selected from known free radical polymerization initiators. Examples of initiators include water soluble initiators, such as, ammonium persulfate, sodium persulfate and potassium persulfate, and organic soluble initiators including organic peroxides and azo compounds including, Vazo peroxides, such as VAZO 64™, 2-methyl 2-2'-azobis propanenitrile, VAZO 88™, 2-2'-azobis isobutyramide dehydrate and combinations thereof. Initiators can be added in amounts from about 0.1 to about 8 wt %, from about 0.2 to about 5 wt % of the monomers.

A chain transfer agent optionally may be used to control the polymerization degree of a latex, and thereby control the molecular weight and molecular weight distribution of product latexes of the latex process and/or an article preparation process according to the present disclosure. As can be appreciated, a chain transfer agent can become part of a latex polymer.

A chain transfer agent can have a carbon-sulfur covalent bond. A C-S covalent bond has an absorption peak in a wave number region ranging from 500 to 800 cm$^{-1}$ in an infrared absorption spectrum. When incorporated into a latex and a toner made from the latex, the absorption peak may be changed, for example, to a wave number region of 400 to 4,000 cm$^{-1}$.

Exemplary chain transfer agents include, but are not limited to, n-$C_{3-15}$ alkylmercaptans; branched alkylmercaptans; aromatic ring-containing mercaptans; and so on. Examples of such chain transfer agents also include, but are not limited to, dodecanethiol (DDT), butanethiol, isooctyl-3-mercaptopropionate, 2-methyl-5-t-butyl-thiophenol, carbon tetrachloride, carbon tetrabromide and the like. The terms, "mercaptan," and, "thiol," may be used interchangeably to mean C—SH group.

Based on total weight of monomers to be polymerized, a chain transfer agent may be present in an amount from about 0.1% to about 7%, from about 0.5% to about 6%, from about 1.0% to about 5%, although may be present in greater or lesser amounts.

In embodiments, a branching agent optionally may be included in a first/second monomer composition to control branching structure of a latex. Exemplary branching agents include, but are not limited to, decanediol diacrylate (ADOD), trimethylolpropane, pentaerythritol, trimellitic acid, pyromellitic acid and mixtures thereof.

Based on total weight of monomers to be polymerized, a branching agent may be present in an amount from about 0% to about 2%, from about 0.05% to about 1.0%, from about 0.1% to about 0.8%, although may be present in greater or lesser amounts.

In forming emulsions, starting materials, optional surfactant, optional solvent and optional initiator may be combined utilizing any means within the purview of those skilled in the art. In embodiments, a reaction mixture may be mixed for from about 1 min to about 72 hrs, from about 4 hrs to about 24 hrs (although times outside those ranges may be utilized), while keeping temperature at from about 10° C. to about 100° C., from about 20° C. to about 90° C., from about 45° C. to about 75° C., although temperatures outside those ranges may be utilized.

Those skilled in the art will recognize that optimization of reaction conditions, temperature, initiator loading and so on can be varied to generate resins of various molecular weight, and structurally related starting materials may be polymerized using comparable techniques.

Once a polymer forms, a resin may be recovered from an emulsion by any technique within the purview of those skilled in the art, including filtration, drying, centrifugation, spray drying and the like, and combinations thereof.

In embodiments are provided methods for preparing, a latex comprised of composite styrene/acrylate metal ionomer resin particles, wherein the resin particles are synthesized in an emulsion polymerization reaction. In embodiments, a surfactant solution is prepared, heated and purged with nitrogen. Once thermal equilibrium is reached, an emulsion of monomers, including, a metal acrylate monomer, styrene/acrylate comonomers, an optional chain transfer monomer and an optional branching monomer is added slowly, such as dropwise, to the heated surfactant solution. An aqueous solution of initiator, such as, ammonium or potassium persulfate, may be added slowly to the reactor. Following addition of all reactants, the emulsion is mixed and heat maintained for about 6-24 hours. Following completion of the polymerization reaction, the emulsion is cooled and the resin particles separated, such as, filtered or sieved, such as, with a 25 µm screen.

A present composite styrene/acrylate resin particle can have a diameter size from about 50 nm to about 200 nm, from about 75 nm to about 150 nm, from about 80 nm to about 130 nm, as measured by, for example, dynamic light scattering, as known in the art. A composite styrene/acrylate resin particle can have a molecular weight from about 10,000 (10 k) to about 500 k, from about 15 k to about 250 k, from about 20 k to about 200 k. Higher molecular weight of composite resin particles indicates chain entanglements due to ionic interactions that may contribute to physical crosslinking of polymer chains. Particle size, such as, diameter, may be a function of time, in other words, length of polymerization reaction, however, the ratio of composite monomers to styrene/acrylate monomers and the degree of chain entanglements, also may influence composite styrene/acrylate resin/metal particle diameter size.

As used herein, reference to "particle size," generally refers to $D_{50}$ mass median diameter (MMD) or log-normal distribution mass median diameter. MMD is considered to be average particle diameter by mass.

Semiconductive electrical properties of the present silver ionomers were analyzed wherein ζpotential was measured. As understood in the art, ζ potential is a measure of magnitude of electrostatic or charge repulsion/attraction between particles and is a fundamental parameter known to impact stability. In other words, ζ potential, also referred to as electrokinetic potential, is an indirect measure or indicator of stability of ionomer particle dispersion. For example, ζ potential measurement may bring detailed insight into causes of dispersion, aggregation or flocculation, and can be used to improve formulation of dispersions, emulsions and suspensions. ζ potential reflects a potential difference between dispersion medium and stationary layer of fluid attached to dispersed particles.

Magnitude of ζ potential indicates the degree of electrostatic repulsion between adjacent, similarly charged particles in a dispersion. For molecules and particles that are small enough, a high ζ potential relates to stability, generally, a value of at least about −55, at least about −65 or lower (greater absolute value) is desirable. As seen in Table 1, a silver composite ionomer of Example 1 had a measured ζ potential of −65.5 mV, which indicates stability of the composite ionomer particle dispersion.

An emulsion polymerization composite resin latex, in addition to finding use in preparation and/or manufacture of ankles, such as, inks, toners, biosensors, antibacterial coatings etc., further can be used to prepare resin nanoparticles wherein the core comprises at least one styrenelacrylate polymer resin and a shell comprises at least one composite styrene/acrylate—metal ion polymer resin.

ii) Nanoparticle Composite Latex

Embodiments herein provide methods of synthesizing composite nanoparticles, wherein metal ions, such as, silver ions, are immobilized in a shell (optionally, also in a core) of a core-shell resin particle. Placement of a metal composite ionomer in a shell provides accessibility of silver ions for applications, such as, an antimicrobial or as a sensor. Materials made from composite nanoparticles include, but are not limited to, aqueous inks, dry inks, toner, additive composites, composites for 3-dimensional printers, gravure printing ink, paints etc.

A core may comprise any styrene/acrylate polymer resin useful for forming nanoparticles, such as, binder resins. Polymers may be synthesized using any of the styrene/acrylate monomers and/or comonomers mentioned above or known in the art, and optionally including a metal ion, by using known conventional methods in the art for forming resin polymers, including bulk polymerization, solution polymerization and emulsion polymerization; there are no intended limitations on the method of synthesizing polymers.

In embodiments, are provided core resin particles wherein the polymers are selected from poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkylacrylate), poly(alkyl methacrylate-aryl acrylate), poly(arylmethacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl aetylate-butadierte), poly(butyl acrylate-butadiene), poly(styrene-isoprene), poly(methystyrene-isoprene), poly(methyl methacrylate-isoprene), poly(ethylmethacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(stytene-butadiene-acrylonitrile-acrylic acid), poly(styrene-butyl acrylate-acrylic acid), poly(styrene-butylacrylate-methacrylic acid), poly(styrene-butyl acrylate-acrylonitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid) and combinations thereof.

In embodiments, a core is prepared via a polymerization reaction, wherein monomers are selected from styrene, alkyl acrylate, such as, methyl acrylate, ethyl acrylate, butyl acrylate, isobutyl acrylate, dodecyl acrylate, n-octyl acrylate, 2-chloroethyl acrylate; β-CEA, phenyl acrylate, methyl α-chloroacrylate, MMA, ethyl methacrylate and butyl methacrylate: butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; pyrrolidone; MA; acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof.

In embodiments, a core particle optionally further comprises styrene/acrylate latex copolymers. Illustrative examples of a styrene/acrylate latex copolymer includes poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(arylmethacrylate-alkyl acrylate); poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(Methylstyrene-butadiene), poly(methyl methacrylate-butadiene), polyethyl methacrylate-butadiene), poly(propyl methacrylate-butadiene), poly(butyl methacrylate-butadiene), poly(methyl acrylate-butadiene), poly acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile) and the like.

In embodiments, a metal acrylate is included in an emulsion. An example of a metal acrylate is a silver acrylate, such as, a silver methacrylate.

In embodiments, a core styrene/acrylate polymer resin optionally further comprises any of the above mentioned chain transfer agents and/or branching agents, including in the above mentioned amounts. A core styrene/acrylate polymer comprises a styrene monomer, an acrylate monomer, optionally a chain transfer agent and optionally a branching agent.

In embodiments are provided methods for preparing a latex comprised of composite nanoparticles. A core styrene/acrylate resin particles may be synthesized in an emulsion polymerization reaction, followed by polymerization of shell monomers on the surface of core particles. In alternative embodiments, a shell resin is formed and then added to the core particle emulsion to form a layer encapsulating the core particles.

In embodiments, a surfactant solution may be prepared, such as, with an anionic surfactant and water, heated and purged with nitrogen. Once thermal equilibrium is reached, an emulsion (optionally including a surfactant) of the core monomers, including styreneiacrylate monomers (c.a. styrene and butyl-acrylate), an optional chain transfer monomer and an optional branching monomer may be added slowly, such as drop wise, to the heated aqueous surfactant solution. An aqueous solution of initiator, such as ammonium or potassium persulfate, may be slowly added to the reactor to form the core resin polymers.

Following formation of the core latex, an emulsion of shell monomers may be prepared and added to the emulsion of core particles wherein a shell comprising composite styrene/acrylate—metal ion polymer resin can be formed covering a part of or encapsulating, that is, covering the whole or entirety, of the surface of core particles. In forming a shell emulsion, shell monomers, e.g. silver (meth)acrylate and methyl methacrylate, optional chain transfer monomer, optional chain branching monomers may be added to an aqueous solution optionally comprising a surfactant. A shell emulsion may be added to the reactor containing optionally heated core particle latex, which forms, "surface seeds," on core resin particles. To complete polymerization of the shell resin, an aqueous solution of initiator, such as ammonium or potassium persulfate, may be slowly added to the reactor. Following addition of all reactants, the emulsion may be mixed and the heat maintained for an extended period of time, such as, about 6-24 hours. Following completion of the polymerization reaction, the emulsion can be cooled and the resin particles may be filtered or sieved, such as with a 25 μm screen.

In embodiments, shell monomers comprise at least one metal acrylate monomer described above and a styrene/acrylate monomer, also described above, in embodiments, a shell comprises a polymer comprising a metal methacrylate and/or metal acrylate, such as, silver acrylate or silver methacrylate.

Composite nanoparticles can be from about 10 to about 200 nm in size, from about 25 to about 150 nm, from about 50 to about 100 nm in size. Composite nanoparticles may be smaller in size, as measured by, for example, dynamic light scattering, than composite resin particles. That may be due to polymerization in situ of a shell resin, instead of forming a shell resin and then adding, to core particles. Polymerization of a composite ionomer resin may result in entanglement of ionic polymer chains, as measured by molecular weight, wherein particles have a larger diameter than those of the composite nanoparticles, see, for example, the data of Table 1. Furthermore, interaction between ionic metal of a composite resin and carboxyl groups acts as ionic crosslinks that may have an effect on properties of a composite ionomer and nanoparticles comprising those composite ionomers, such as solubility in chemical solvents, $T_g$, molecular weight and water sensitivity.

In embodiments, electric conductivity of the present metal nanoparticles was analyzed wherein the ζ potential was measured. As described above, magnitude of ζ potential indicates stability of nanoparticles in a dispersion. As seen in the data of Table 1, the silver composite nanoparticles of Example 2 had a measured ζ potential of −82.4 mV, which indicates stability of the composite nanoparticle dispersion.

D) Composite Resin Compositions

In embodiments are provided articles comprising a composite nanoparticle and/or composite styrene/acrylate ionomer resin, Composite nanoparticles comprise a core comprising at least one styrene/acrylate polymer resin, optionally comprising a metal, and a shell comprising at least one composite styrene/acrylate metal on polymer resin. A composite styrene/acrylate ionomer resin comprises at least one metal ion acrylate monomer and a styrene/acrylate comonomer. In embodiments, an article includes a biochemical sensor, an optical detector, an antimicrobial, a textile, a fuel cell, a functional smart coating, a solar cell, a cosmetic, an electronic component, a fiber or a cryogenic superconducting material, In embodiments, a composite nanoparticle and/or composite styrene/acrylate ionomer resin are used as binder resins in inks (aqueous and dry), toner particles, antimicrobial coatings, additives, finishes, paints and composites for 3-dimensional printing.

In embodiments are provided toner particles that comprise a present composite styrenelacrylate ionomer resin. In the instance of core-shell toner particles, that ionomer resin may he present in the core, in the shell or both. In embodiments, are provided toner particles that comprise the present composite nanoparticles. In the instance of core-shell toner particles, that composite nanoparticle may be present in the core, in the shell or both. Methods are well known for preparing toner particles, including emulsion aggregation methods that produce toner particles comprising a core and shell, including as described in U.S. Pat. Nos. 5,302,486; 6,294,306; 7,985526; and 8,383,310, each of which herein is incorporated by reference in entirety.

Thus, an ionomer of interest or a core-shell particle of interest can be combined with an optional other resin, such as, a different or non-metal ion containing styrene/acrylate resin, a polyester resin and so on, optional surfactant, optional wax, optional colorant and any other toner reagent to form nascent toner particles, for example, by emulsion aggregation. After growth to art appropriate size, such as, from about 2 μm to about 8 μm, toner particles can be finished, for example, polishing the surface of the toner particles to form smooth and circular particles for use as toner in any known imaging material and method, where toner is displayed imagewise on a substrate, which image can be transferred to a second substrate, and the image fixed or fused to a substrate intended to carry the image, as known in the art. A toner of interest can be used in a method for forming a Structure or device by a 3-D method or device.

Thermoplastic and thermosetting styrene and acrylate polymers comprising a silver ion can be used for 3-D printing by any of a variety of materials and methods, such as, selective heat sintering, selective laser sintering, fused deposition modeling, robocasting and so on. A resin can be formed into sheets for use in laminated object manufacturing. In embodiments, a resin is configured as a filament. Granular resin can be used in selective laser melting methods. Ink jet devices can deliver resin.

Examples of polymers include acrylonitrile butadiene styrene, polyethylene, polymethylmethacrylate, polystyrene and so on. In embodiments, polymers can be mixed with an adhesive to promote binding. In embodiments, an adhesive is interleaved with a layer of cured or hardened polymer to bind leafs or layers.

A polymer may be configured to contain a compound that on exposure to a stimulant decomposes and forms one or more free radicals, which promote polymerization of monomers of a polymer of interest, such as, forming branches, networks and covalent bonds. For example, a polymer can comprise a photoinitiator to induce curing on exposure to white light, an LED, UV light and so on. Such materials can be used in stereolithography, digital light processing, continuous liquid interface production and so on.

Waxes and other curing, material can be incorporated into a 3-D composition or can be provided as a separate composition for deposition on a layer of a resin of interest or between layers of a resin of interest.

For example, a selective laser sintering powder, such as, a polyacrylate or polystyrene, is placed in a reservoir atop a delivery piston. Granular resin is transferred from the reservoir to a second void comprising a fabrication piston which carries the transferred resin in the form of a thin layer. The thin layer is then exposed to a light or a laser tuned to melt and to fuse selected sites of the layer of resin particles. A second layer of resin granules is added from the reservoir to the fabrication void and the laser again melts and fuses selected portions of the layer of granules. The heating and fusion is of an intensity and strength to enable heating and fusing of sites from the second layer to sites of the first layer, thereby forming a growing solid structure in the vertical direction. In embodiments, an adhesive is applied to the fused first layer before the unfused granular resin for the second layer is applied. When completed, the unfused resin powder is removed leaving the fused granules in the form of a designed structure. Such a manufacturing method is an additive process as successive layers of the structure are laid down consecutively.

Composites herein can be can be used to manufacture articles, such as, sensors, materials with solvent switchable electronic properties, optical limiters and filters, and optical data storage. Plasmonic properties of metals enables bioimaging because, contrary to commonly used fluorescent dyes, nanoparticulate metal does not undergo photobleaching and can be used to monitor dynamic events over an extended period of time. Composites disclosed herein also can be used as catalysts.

The following Examples are submitted to illustrate embodiments of the disclosure. The Examples are intended to be illustrative only and are not intended to limit the scope of the disclosure. Also, pans and percentages are by weight unless otherwise indicated. As used herein, "room temperature," (RT) refers to a temperature of from about 20° C. to about 30° C.

EXAMPLES

Example 1

Emulsion Polymerization Latex with 1% Silver Methacrylate

A latex emulsion comprised of polymer particles generated from emulsion polymerization of styrene, n-butyl acrylate and silver methacrylate was prepared as follows.

A surfactant solution of 0.69 g Dowfax 2A1 (anionic surfactant, Dow) and 83.4 g de-ionized water (DEW) was prepared by mixing for 10 min in a 500 ml round bottom flask that was placed on an electric heating mantle and purged with nitrogen. The flask was purged continuously with nitrogen while being stirred at 195 rpm. The reactor was heated to 70° C. at a controlled rate.

Separately, 1.52 g of ammonium persulfate (APS) initiator were dissolved in 13.3 g of DIW.

Separately, 73.54 g of styrene, 27.58 g of butyl acrylate, 1.02 g of silver methacrylate, 1.78 g of 1-dodecanethiol (DDT) and 0.36 g of 1,10-decanediol diacrylate (ADOD) were added to a premix of 3.91 g of Dowfax 2A1 in 44.68 g of DIW and mixed to form an emulsion. Then, 7.44% of the above emulsion (7.63 g) was dropped slowly into the reactor containing the aqueous surfactant phase at 70° C. to form, "seeds," while being purged with nitrogen. The initiator solution was charged slowly into the reactor. The monomer emulsion feed then was started and added over 140 min. Once all the monomer emulsion was charged into the reactor flask, the stirring was increased to 210 rpm and the temperature was held at 70° C. overnight (approximately 20 hrs) to complete the reaction. The heat was turned off and the latex was left to cool while stirring. The product then was sieved through a 25 μm screen.

The particle size was measured by NANOTRAC U2275E particle size analyzer and found to have a $D_{50}$ of 83.2 nm and $D_{95}$ of 127.6 nm. The solids content was 35.15%.

Example 2

Core-Shell Particle with 1% Silver Methacrylate in Shell

A latex emulsion comprised of polymer particles generated from the emulsion polymerization of styrene and n-butyl acrylate in the core and silver methacrylate and methyl methacrylate in the shell was prepared as follows.

A surfactant solution of 2.52 g sodium lauryl sulfate (anionic surfactant (SLS), Sigma Aldrich) and 81.2 g DIW was prepared by mixing for 10 min in a 500 ml round bottom flask that was placed on an electric heating mantle and purged with nitrogen. The flask was purged continuously with nitrogen while being stirred at 195 rpm. The reactor was heated to 70° C. at a controlled rate.

Separately, 1.38 g of potassium persulfate (KPS) initiator were dissolved in 13 g of DIW.

In another vessel, 41 g of styrene, 51.25 g of butyl acrylate and 2.38 g of DDT were added to a premix of 5.87 g of STS in 43.53 g of DIW and mixed to form an emulsion. Then, 8.36% of the above emulsion (7.71 g) was dropped slowly into the reactor containing the aqueous surfactant phase at 70° C. to form the, "seeds," while being purged with nitrogen. The initiator solution then was charged slowly into the reactor. The monomer emulsion feed was then started and took about 2 hours.

In the meantime, the shell monomer was prepared by combining 1 g of silver methacrylate, 9.23 g of methyl methacrylate and 0.42 g of DDT with a premix of 1 g of SLS in 10 g of DIW to form an emulsion, Then, 21.21% of the above emulsion (2.17 g) was dropped slowly into the reactor containing the core latex at 70° C. to form the, "surface seeds," on the core particles while being purged with nitrogen. An initiator/sodium bicarbonate solution of 0.345 g potassium persulfate and 0.184 g sodium bicarbonate in 3.25 g of DIW then was charged slowly into the reactor (dropwise, via pipette). The remaining shell monomer emulsion feed was added dropwise over 30 minutes.

Once all the shell monomer emulsion was charged into the reactor flask, the stirring was increased to 210 rpm and the temperature was held at 70° C. overnight (approximately 20 hrs) to complete the reaction. The heat was turned off and the latex was left to cool while stirring. The product was sieved through a 25 µm screen.

The particle size was measured by NANOTRAC U2275E particle size analyzer and was found to have a $D_{50}$ of 42.1 nm and $D_{95}$ of 68.4 nm. The solids content was 29.49%.

Example 3

Synthesis of Control Polystyrene-co-n-butyl Acrylate Latex

A latex emulsion comprised of polymer particles generated from polymerization of styrene, n-butyl acrylate and βCEA was prepared as follows.

A surfactant solution of 6.9 g Dowfax 2A1 and 306.7 g DIW water was prepared by mixing for 10 min in a stainless steel holding tank. The holding tank then was purged with nitrogen for 5 mins before transferring to the reactor. The reactor was purged continuously with nitrogen while being stirred at 450 rpm. The reactor was heated to 80° C.

Separately, 7.1 g of ammonium persulfate were dissolved in 48.9 g of DIW.

Separately, 264.9 g of styrene., 88.3 g of butyl acrylate, 10.6 g of β-CEA and 1.6 g of DDT were added to a premix of 0.6 g of Dowfax 2A1 in 164.32 g of DIW were mixed to form an emulsion. The, 2% of the above emulsion (10.6 g) was dropped slowly into the reactor containing, the aqueous surfactant phase at 80° C. to form the, "seeds," while being purged with nitrogen. The initiator solution was charged slowly into the reactor. The monomer emulsion was fed into the reactor at 2 g/min. Once all the monomer emulsion was charged into the main reactor, the temperature was held at 80° C. for an additional 3 hrs to complete the reaction. Full cooling then was applied and the reactor temperature was reduced to 25° C. The product was collected into a holding tank and sieved, with a 25 µm screen.

The particle size was measured by NANOTRAC U2275E particle size analyzer and found to have a $D_{50}$ of 220 nm.

Example 4

Data

The following Table provides analytical data of the two latexes synthesized with Ag methacrylate, Examples 1 and 2, as compared to the control latex of Example 3. GPC is gel permeation chromatography, conducted as known in the art using, for example, agarose as the medium. TGA is thermogravimetric analysis.

It is seen that the latex of Example 1 has a large molecular weight as compared to the control latex. The resin of Example 1 also has a smaller particle size. That can be due to chain entanglements due to the ionic interactions that may be contributing to physical crosslinks in the polymer chains due to incorporation of the branching agent. Otherwise, silver in the binder resin has no adverse impact on resin properties. The latexes of Examples 1 and 2 show nanoparticles with high stability based on ζ potential analysis that may be due to the strategic placement of the silver methacrylate in the binder resin and shell composite.

TABLE 1

| Results | Example 1 Latex | Example 2 Latex | Control Latex |
|---|---|---|---|
| DSC-2nd Onset $T_g$ | 51.84° C. | 93.47° C. | 56.57° C. |
| DSC-2nd Midpoint $T_g$ | 55.71° C. | 96.80° C. | 60.03° C. |
| DSC-2nd Offset | 59.60° C. | 100.14° C. | 63.49° C. |
| GPC-$M_w$ | 189,304 | 20,378 | 54,608 |
| GPC-$M_n$ | 22,571 | 6,817 | 23,230 |
| Polydispersity | 8.387 | 2.990 | 2.351 |
| ICP-MS—Ag | 33.8 ppm | 204.2 ppm | 0 ppm |
| TGA-Residue | 0.2146% wt. loss | 3.645% wt. loss | n/a |
| Particle Size-$D_{50}$ | 83.2 nm | 42.1 nm | 220 nm |
| Particle Size-$D_{95}$ | 127.6 nm | 68.4 nm | n/a |
| ζ Potential (mV) | −64.5 mV | −82.4 mV | n/a |
| ζ Deviation (GSD) | 12.5 mV | 10.5 mV | n/a |
| Conductivity | 0.115 mS/cm | 0.0780 mS/cm | n/a |

The SEM of the latex of Example 1, as compared to the Control latex, confirms presence of Ag on the surface of the resin methacrylate particles which are revealed as bright spots. As observed in the energy dispersive X-ray spectroscopy (EDS), the Ag nanocrystallites of the Example 2 latex display an optical absorption band peaking at 3 keV which is typical of the absorption of metallic silver nanocrystallites (Kohler et al., Sens Actuators B Chem. 2001; 76(1-3): 66-172).

Example 5

Preparation of Toner with Silver in Binder Resin or Shell

Into a 500 liter glass reactor are added DIW and the resin of Example 1 or 3 for a total solids of 15%. The reactor is fitted with a mechanical agitator and equipped with a single pitched blade impeller. The mixture is agitated at 250 rpm and heated via an electric heating mantle to 55° C. After 20 min, once the temperature of the solution reached 55° C., the rpm is increased to 400 and a zinc acetate solution (3 g of zinc acetate dihydrate in 60 g of DIW) is added incrementally. After all the zinc acetate solution is added, the temperature is increased by 1 degree to 56° C. The toner particle size, as measured by a COULTER COUNTER is found to be 3 µm. The temperature is increased another degree to 57° C. and particle growth is monitored via the COULTER COUNTER. After 45 min, the heat is turned off and the reactor contents are cooled to RT. The final toner particle size is 4 µm. The toner is discharged from the reactor and the particles are filtered from the mother liquor and washed 2 times with DIW. The toner is dispersed in DIW and stored.

Example 6

Preparation of Toner with Silver on the Surface of the Toner

The reaction is carried out in a 3-necked, 500 mL round bottom flask as in Example 5. Once the toner particles attained a size of 4 µm, the temperature is reduced to 48° C. and 0.5 g of AgNO₃ (4% wt per resin) dissolved in 50 mL DIW are added to the reactor at a rate of approx. 0.5 mL/min (RPM=300). The solution became slightly pink. After 2 hr, 30 mL of 1% trisodium citrate solution (reducing agent) are added to the reactor at a rate of approx. 0.4 mL/min (RPM=300). Then, the solution is allowed to cool overnight to RT (RPM=180) and then passed through a 25 µm sieve. The final appearance of the emulsion is a light pink opaque solution. Energy dispersive spectroscopy-scanning electron microscopy (EDS-SEM) confirmed the presence of silver on the surface of the toner particles, as compared to a control sample taken from the same reaction prior to silver addition.

Example 7

Wet Deposition of Antimicrobial Toner to Mimic Toner Transfer and Fusing

A suspension of toner from Example 5 or 6 is prepared in water containing a small amount of Triton X-100 surfactant. An amount of the suspension corresponding, to 9.62 mg of toner particles is passed through a glass microfiber membrane with an exposed surface area of 9.62 cm². The retained particles and microfiber membrane are dried at RT, then enveloped in MYLAR film and passed through a laminator set to 120° C.

Microfiber samples are placed on a bacterial lawn. Results after 3 days of incubation at 37° C. confirm that the silver-containing toner show no bacteria growth around the fused toner swatch or on the swatch. The zone of inhibition or halo is large which means that silver ions are released from the toner and diffuse into the agar over the 3-day period.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A composite nanoparticle comprising:
a core comprising a styrene/acrylate polymer core resin, optionally comprising a metal; and
a shell comprising a metal ion ionomer resin, wherein the metal ion ionomer resin comprising the shell comprises a styrene/acrylate polymer including a silver acrylate monomer that is incorporated into the styrene/acrylate polymer via polymerization.

2. The composite nanoparticle of claim 1, wherein the styrene/acrylate core resin comprises one or more comonomers selected from styrene acrylates, styrene butadienes, styrene methacrylates and combinations thereof.

3. The composite nanoparticle of claim 1, wherein the styrene/acrylate polymer core resin comprises a member of the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butyl methacrylate), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof.

4. The composite nanoparticle of claim 1, wherein the metal of the shell metal ion ionomer resin comprises a silver.

5. The composite nanoparticle of claim 1, wherein the shell metal ion ionomer resin comprises a silver composite monomer selected from a silver acrylate monomer, a silver methacrylate monomer or combinations thereof.

6. The composite nanoparticle of claim 5, wherein the shell metal ion ionomer resin comprises a silver composite monomer and wherein the silver composite monomer is present in the shell metal ion ionomer resin in an amount of from about 0.01% to about 10%, by weight of the total monomers of the shell metal ion ionomer resin.

7. The composite nanoparticle of claim 5, wherein the shell resin further comprises a comonomer selected from methyl methacrylate, butyl acrylate, diacrylate, cyclohexyl methacrylate, styrene, methacrylic acid, dimethylaminoethyl methacrylate or combinations thereof.

8. The composite nanoparticle of claim 1, wherein diameter ($D_{50}$) of the composite nanoparticle is from about 10 to about 200 nm in size.

9. The composition nanoparticle of claim 1, wherein the core resin comprises a silver composite monomer selected from a silver acrylate monomer, a silver methacrylate monomer or combinations thereof.

10. A latex comprising the composite nanoparticle of claim 1.

11. The latex of claim 10, wherein said core resin comprises a metal.

12. The latex of claim 10, wherein the styrene/acrylate core resin comprises one or more comonomers selected from styrene acrylates, styrene butadienes, styrene methacrylates and combinations thereof.

13. The latex of claim 10, wherein the styrene/acrylate polymer core resin comprises a member of the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butyl methacrylate), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof.

14. The latex of claim 10, wherein the shell resin comprises a silver composite monomer selected from a silver acrylate monomer, a silver methacrylate monomer or combinations thereof.

15. An article of manufacture comprising the latex of claim 10.

16. The article of claim 15, comprising an ink or a toner.

17. The article of claim 15, wherein said toner comprises an optional wax, an optional colorant or both.

18. The article of claim 15 comprising a two-dimensional image or a structure.

19. A composite nanoparticle having a diameter ($D_{50}$) comprising:
 a core comprising a styrene/acrylate polymer core resin, optionally comprising a metal; and
 a shell comprising a metal ion ionomer resin;
 wherein the diameter ($D_{50}$) of the composite nanoparticle is from about 10 to about 200 nm in size.

* * * * *